US008938038B2

(12) United States Patent
Reial et al.

(10) Patent No.: US 8,938,038 B2
(45) Date of Patent: Jan. 20, 2015

(54) EXTENDING THE SET OF ADDRESSABLE INTERFERERS FOR INTERFERENCE MITIGATION

(75) Inventors: Andres Reial, Malmö (SE); Anders Wallén, Ystad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 178 days.

(21) Appl. No.: 13/364,856

(22) Filed: Feb. 2, 2012

(65) Prior Publication Data
US 2013/0202063 A1    Aug. 8, 2013

(51) Int. Cl.
H03D 3/00    (2006.01)

(52) U.S. Cl.
USPC ........ 375/346; 375/258; 375/260; 455/226.2; 455/354

(58) Field of Classification Search
USPC ......... 375/340, 343, 346; 455/65, 63.1, 278.1
See application file for complete search history.

(56) References Cited

U.S. PATENT DOCUMENTS

| | | | |
|---|---|---|---|
| 6,301,470 B1 * | 10/2001 | Brunner et al. | 455/278.1 |
| 7,130,365 B2 * | 10/2006 | Li | 375/346 |
| 8,284,854 B2 * | 10/2012 | Kwak et al. | 375/267 |
| 2004/0224636 A1 * | 11/2004 | Schmidl et al. | 455/63.1 |
| 2007/0110133 A1 | 5/2007 | Guess et al. | |
| 2009/0232247 A1 * | 9/2009 | Nam et al. | 375/267 |
| 2009/0285341 A1 * | 11/2009 | Pukkila et al. | 375/346 |
| 2010/0158173 A1 * | 6/2010 | Lee et al. | 375/346 |
| 2010/0278218 A1 | 11/2010 | Yu et al. | |
| 2010/0323625 A1 * | 12/2010 | Kishigami et al. | 455/65 |
| 2011/0135023 A1 * | 6/2011 | Kwon et al. | 375/260 |
| 2011/0222618 A1 | 9/2011 | Huss et al. | |
| 2012/0189083 A1 | 7/2012 | Reial | |

FOREIGN PATENT DOCUMENTS

EP    1796414 A1    6/2007

OTHER PUBLICATIONS

Lindoff, B. et al. "Control Channel Decoding of Neighboring Cells." Co-pending U.S. Appl. No. 13/172,908, filed Jun. 30, 2011.
Jonsson, E. et al. "A Method and Apparatus for Identifying Other User Equipment Operating in a Wireless Communication Network." Co-pending U.S. Appl. No. 13/291,900, filed Nov. 8, 2011.

(Continued)

*Primary Examiner* — Eva Puente
(74) *Attorney, Agent, or Firm* — Murphy, Bilak & Homiller, PLLC

(57) ABSTRACT

Techniques for expanding the set of addressable interfering signals in an interference cancelling receiver are described, where the task of control message detection from interfering cells is integrated in an iterative receiver process where increasingly better a priori information on the received data signals from the previous iteration is used to detect additional control messages and successively grow the set of interfering signals included in the receiver's interference mitigation processing. In an example method, first estimated symbols for a desired signal are generated. A control channel corresponding to a first interfering signal is detected, where said detecting is based on the first estimated symbols. Signal characteristics information for the first interfering signal is then derived from the detected control channel signal, and used to generate second estimated symbols for the desired signal, using an interference-mitigation technique to mitigate the effects of the interfering signal.

38 Claims, 6 Drawing Sheets

(56) References Cited

OTHER PUBLICATIONS

Unknown, Author. "Requirements of Downlink Inter-cell Interference Detection/subtraction and TP." RITT, CATT. R1-060199. 3GPP TSG-RAN WG1 L TE Ad Hoc Meeting. Jan. 23-25, 2006. Helsinki, Finland.

Thomas, Jospeh. "Throughput Enhancement of Random Access in Unstructured Networks via Successive Decoding." IEEE Vehicular Technology Conference. Apr. 1, 2007.

* cited by examiner

EXTENDING THE SET OF ADDRESSABLE INTERFERERS FOR INTERFERENCE MITIGATION

BACKGROUND

The present invention generally relates to wireless communications receivers, and more particularly relates to techniques for suppression of interfering signals to improve receiver performance.

The data rate that can be supported between two devices in a wireless communication system is very often limited by interference from nearby transmitters utilizing the same spectrum. Specifically, for the downlink (base station to wireless terminal transmissions) in a wireless cellular network, receiver performance at the targeted wireless terminal is often limited by interference from other cells. Similar problems apply to the base station receiver, for uplink transmissions.

The impact of interference from other cells can be characterized in terms of a "geometry factor." The geometry factor is defined as the total received power from the serving cell divided by the receiver power from all other neighbor cell base stations on the same carrier frequency. Since other base stations largely will be perceived as noise, the geometry factor thus is a measure of the current signal-to-noise (SNR) operating point of the device. For instance, a wireless terminal near a cell edge may receive transmissions at similar strengths from the serving base station and from one or more neighboring cells, leading to a low geometry factor for the desired own-cell signal. This can be seen in FIG. 1, where wireless terminal or user equipment (UE) 120 is served by base station 110, but is near the edge of the cell. As a result, wireless terminal 120 suffers interference from signals transmitted by another base station 130, which is serving wireless terminal or user equipment (UE) 140. Other-cell interference is often the dominant impairment even for wireless terminals not located at or near a cell border.

The bulk of the interference contributed by the other cell(s) is typically due to traffic data transmission. By reducing the effective power of such interference, the effective geometry factor for the own-cell signal may be improved and performance gains achieved. Several techniques may be used to mitigate the interference.

One category of these techniques is linear interference suppression. If the UE has several receiver antennas, the effective antenna lobe for the receiver may be steered so as to point a spatial null in the direction of arrival for the dominant interfering signal, leading to improved signal-to-interference-plus-noise ratios (SINR) for the desired signal. Statistics of the received signal are used to determine receiver combining weights that lead to the desired spatial pattern. Techniques for this, such as several variations of interference rejection combining (IRC) algorithms, are well known.

Another category of interference-mitigation techniques is interference cancellation. With these techniques, all or part of the interfering signal is reconstructed and explicitly subtracted from the received signal. In a simple successive interference-cancellation receiver, the interfering signal may be demodulated and/or decoded. The resulting bit sequence is used to reconstruct the transmitted interfering symbol sequence. This symbol sequence is then filtered to mimic the effects of the interfering signal's channel and subtracted from the received signal. After that, the desired signal is demodulated and decoded, with better quality than would have been possible without the interference cancelling step.

Another approach to reducing the effect of interfering signals is joint demodulation of the desired signal and an interfering signal. With this approach, several received signal components are considered jointly in demodulation. (The terms "joint demodulation" and "joint detection" are used interchangeably herein, to refer to this general technique.) A multitude of received symbol hypotheses are formed, corresponding to the multiple possible symbols that have been transmitted through the end-to-end propagation channel. The symbol to be detected thus becomes a higher-dimensional super-symbol, which includes the interactions of the signals to be jointly detected. Maximum-likelihood detection (MLD) or near-MLD algorithms may be used to perform the demodulation.

While all of these forms of interference mitigation may provide performance gains across a wide variety of scenarios, the largest gains are typically available when the signal structure and the transport format of the interfering signals is known. For example, the interference-cancellation and joint-demodulation approaches require knowledge of resource allocation, such as the codes used by interfering signals in code-division multiple access (CDMA) systems (e.g., in High-Speed Downlink Packet Access, or HSDPA, systems), or the resource blocks allocated to interfering signals in Orthogonal Frequency-Division Multiplexing (OFDM) systems (e.g., in the $3^{rd}$-Generation Partnership Project's Long-Term Evolution, or LTE, systems). These approaches also work best when the details of the modulation technique used for the interfering signals (e.g., a Quadrature-Amplitude Modulation, or QAM, mode) are known, and/or when the details of a Multiple-Input Multiple-Output (MIMO) configuration, such as the transmission rank and precoding vectors, are known. Furthermore, when the interference-suppressing receiver uses iterative (Turbo) decoding techniques, knowledge of the transport block format (TFRC) for an interfering signal allows the channel coding gain present in the interfering signal to be used to obtain the best possible signal estimate for subtraction. In various wireless systems, this information (transport block formats, resource allocations, etc.) is conveyed via downlink control channels, such as the High-Speed Shared Control Channel (HS-SCCH) in HSDPA systems and the Physical Downlink Control Channel (PD-CCH) in LTE systems.

A variety of advanced receiver structures exist to combat interference and improve the geometry factor for the desired signal. In one solution for an interference-mitigating receiver, the signal quality for the desired signal and the signal quality for the interfering signal (e.g. SINR) are both estimated. Decoding of the interfering users' control messages is then attempted. Depending on the signal qualities and the information available from the control messages regarding resource allocation and transport formats, a suitable receiver configuration may be chosen to carry out interference mitigation.

To decode a control message meant for another user, a wireless terminal-specific index (UE ID in HSDPA, RNTI in LTE) for the other user is typically required to de-mask the control message. While this information may not be openly available in the network, it may be inferred using blind detection approaches. Other neighbor cell configuration information required for demodulation of the control channel signals for another user is often available to a mobile terminal via neighbor-cell list information in higher-layer signaling. This assumption is also made by a parametric Type 3i receiver specified in 3GPP RAN4 for HSDPA, and is necessary for conducting standard wireless terminal measurements, such as for reporting neighbor-cell received-signal code power (RSCP).

SUMMARY

When receiving interfering data transmission from other cells, the availability of the associated control information is not guaranteed. For instance, the wireless terminal receiving an interfering signal is often located further away from the interfering base station than the designed coverage area for the other-cell control channels. Furthermore, a wireless terminal near the edge of a neighbor cell may not receive control messages from that neighbor cell with sufficient quality, especially if the control channel signal is power controlled so as to be just strong enough to be reliably received by the target wireless terminal while minimizing signaling overhead in the system. Therefore, the received power of control messages associated with interfering signals at a wireless terminal receiving the interference is often too low and the control messages cannot be successfully decoded.

Because successful decoding of control messages meant for the other-cell interfering users is a prerequisite for applying many of the most efficient interference mitigation modes, the application of those receiver modes, or the number of interfering users to which these receiver modes may be applied, may be severely limited in many scenarios. There is thus a need for techniques to expand the set of addressable signals in the downlink, to enable more efficient interference mitigation.

In several embodiments of the present invention, the task of control message detection from interfering cells is integrated in an iterative receiver process where increasingly better a priori information on the received data signals from the previous iteration is used to detect additional control messages and successively grow the set of interfering signals included in the receiver's interference mitigation processing.

The techniques described below may be implemented in the form of an iterative/Turbo receiver structure where detection of other-cell control messages is re-attempted at each iteration. The set of addressable interferers may be expanded as the a priori information improves due to the inclusion of more signals in the interference mitigation process.

In an example method, suitable for implementation by an interference-cancelling communications receiver, first estimated symbols for a desired signal are generated. A control channel corresponding to a first interfering signal is detected, where said detecting is based on the first estimated symbols. Various techniques may be used to detect the control channel, including subtractive interference cancellation, in which an estimate of the desired signal is removed from a received composite signal, and joint demodulation, in which the estimated symbols for the desired signal and for the control channel are jointly demodulated.

Signal characteristics information for the first interfering signal is then derived from the detected control channel. This derived signal characteristics information is used to generate second estimated symbols for the desired signal, using an interference mitigation technique to mitigate the effects of the interfering signal. Because the set of addressable interfering signals has been expanded, using control channel information that is obtained using information from the first attempt at demodulating the desired signal, better interference suppression may be achieved, yielding improved signal-to-interference-noise performance with respect to the desired signal.

In some embodiments, the generation of the first estimated symbols may also utilize interference-mitigation processing, using known signal characteristics for at least one previously identified interfering signal. This interference-mitigation processing comprises jointly detecting the first estimated symbols and the at least one previously identified interfering signal, using the known signal characteristics, in some embodiments, and subtractive interference cancellation of the at least one previously identified interfering signal, in others. The at least one previously identified interfering signal is identified, in some embodiments, by evaluating neighbor cell signal strength measurements and selecting an interfering signal based on this evaluating.

In some embodiments, a different interference-mitigation technique may be used in subsequent iterations of the processing. The technique used with the expanded set of interferers may vary, depending on what is learned from the detected control channel. For example, generating the first estimated symbols for the desired signal is based on a first interference mitigation technique, in some embodiments, while a second interference-mitigation technique is selected for generating the second estimated symbols in the next iteration, based on the signal characteristics information derived from the detected control channel. In various embodiments, these first and second interference-mitigation techniques are from the group consisting of: no interference mitigation; linear interference suppression; joint demodulation; pre-decoding subtractive interference cancellation; and post-decoding subtractive interference cancellation. Of course, other suitable interference processing may be used instead of or in addition to any of these techniques.

Receiver circuits adapted to perform the techniques summarized above are also disclosed in detail in the following discussion. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
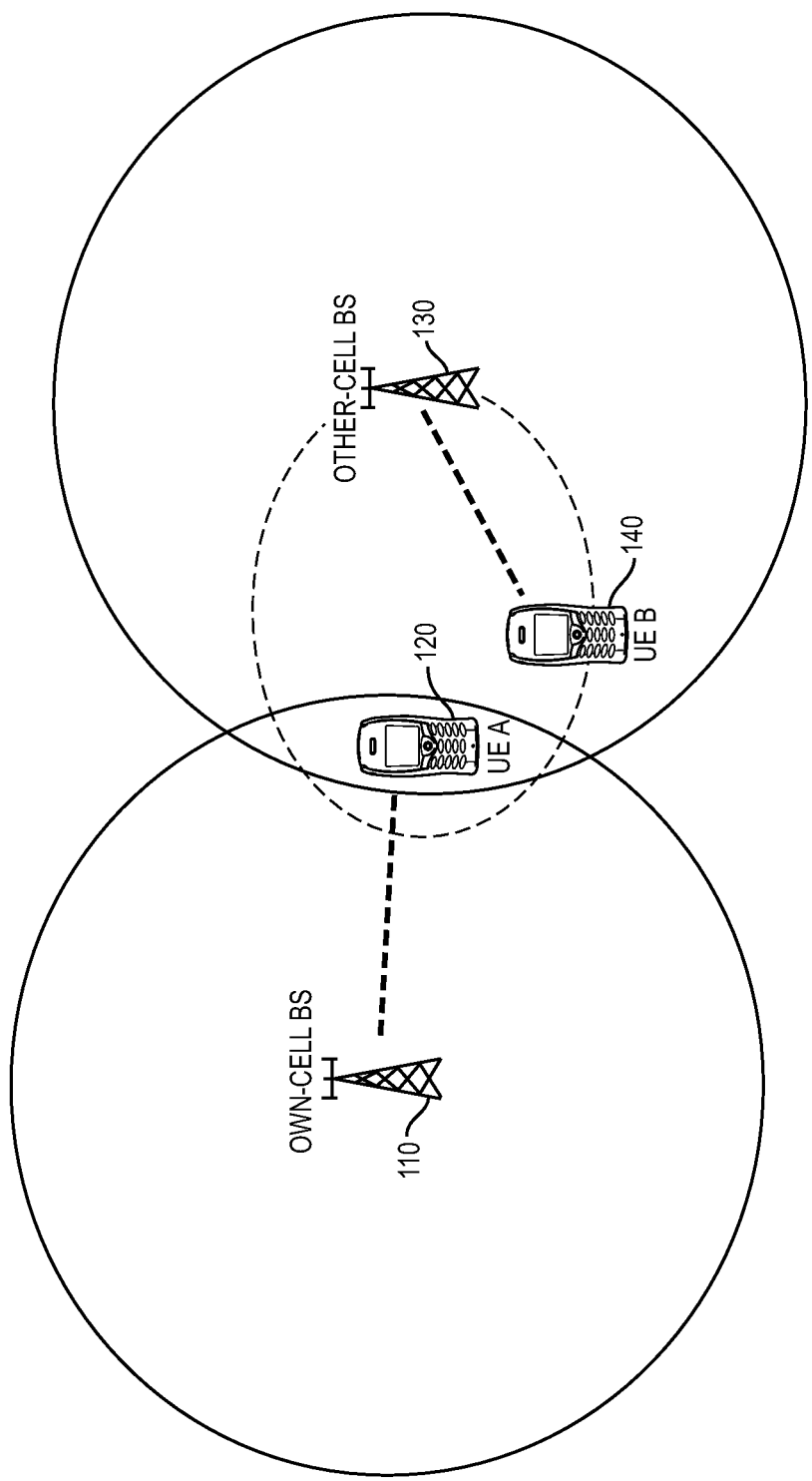
FIG. 1 illustrates an example of neighbor-cell interference in a wireless communications network.

The invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Thus, components or features from one embodiment may be assumed to be present or used in another embodiment, where such inclusion is suitable.

For purposes of illustration and explanation only, these and other embodiments of the present invention are described herein in the context of operating in a radio access network (RAN) that communicates over radio communication channels with wireless terminals (also referred to as user equipment, or "UEs"). It will be understood, however, that the present invention is not limited to such embodiments and may be embodied generally in any type of communication network. As used herein, the terms mobile terminal, wireless terminal, or UE can refer to any device that receives data from a communication network, and may include, but are not limited to, a mobile telephone ("cellular" telephone), laptop/portable computer, pocket computer, hand-held computer, and/or desktop computer.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs. High-Speed Packet Access (HSPA) technology, which includes High-Speed Downlink Packet Access (HSDPA) technology, is one component of the specifications for UTRAN.

The Third Generation Partnership Project (3GPP) has undertaken to further evolve the UTRAN and GSM based radio access network technologies. In this regard, specifications for the Evolved Universal Terrestrial Radio Access Network (E-UTRAN) have been released and are still being developed within 3GPP. The Evolved Universal Terrestrial Radio Access Network (E-UTRAN) comprises the Long Term Evolution (LTE) and System Architecture Evolution (SAE).

While terminology from 3GPP's specifications for LTE and UTRAN systems are used in this disclosure to exemplify embodiments of the invention, this should not be seen as limiting the scope of the invention to only these systems. Other wireless systems, including WiMax (Worldwide Interoperability for Microwave Access), UMB (Ultra Mobile Broadband), and GSM (Global System for Mobile Communications) may also benefit from exploiting embodiments of the present invention disclosed herein.

Also note that the use of terminology such as base station (also referred to as NodeB, eNodeB, or Evolved Node B) and wireless terminal (also referred to as UE or User Equipment) should be considering non-limiting and does not necessarily imply a certain hierarchical relation between the two. In general, a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of the invention may also be applied, for example, in the uplink.

Figure 2:
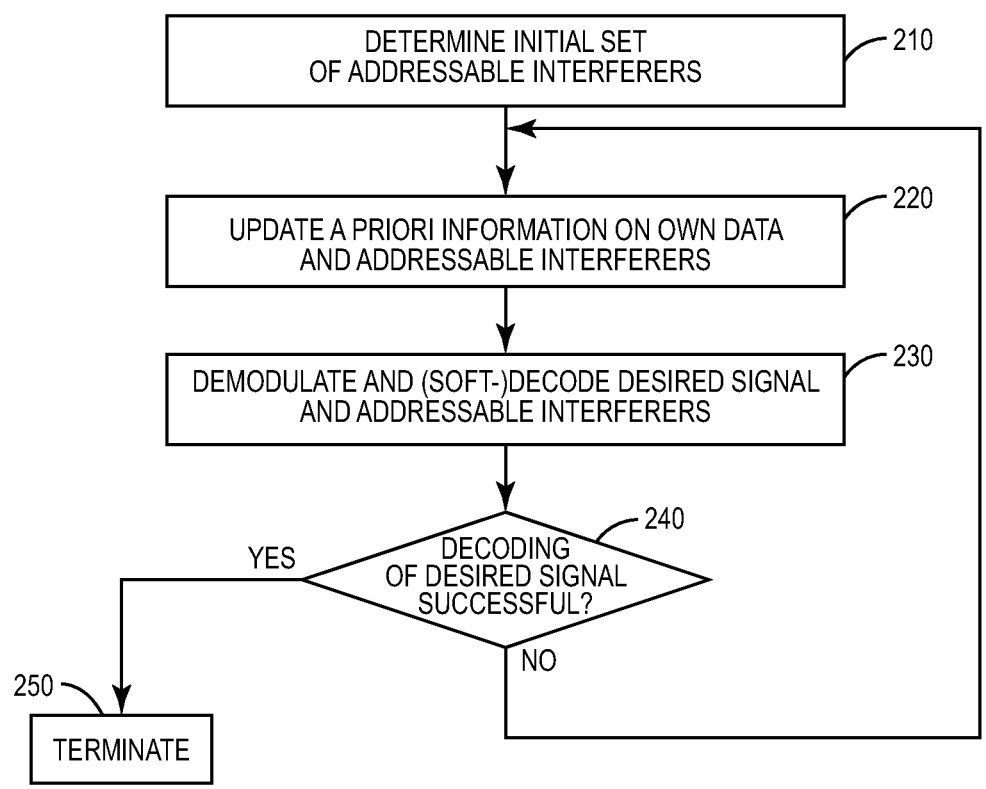
FIG. 2 is a process flow diagram illustrating an example technique for performing interference mitigation in a wireless receiver.

FIG. 2 illustrates, at a high level, an interference cancellation process carried out in a communications receiver, such as in a wireless terminal or UE or base station. The process begins, as shown at block 210, with the identification of a set of addressable interfering signals. In a wireless terminal, for example, these interfering signals may include own-cell interferers, such as signals intended for other wireless terminal, or signals from neighboring cells. As shown at block 220, the receiver updates its knowledge of the desired signal and the addressable interferers, such as by extracting resource allocation information and transport format information from control channel signals. In some cases, this may require de-masking a control message targeted to another user. While this information may not be openly available in the network, it may be inferred using blind detection approaches. Techniques for doing so are described in detail in U.S. patent application Ser. No. 13/172,908 and in U.S. patent application Ser. No. 13/291,900; the entire contents of both of these applications are incorporated herein by reference.

This is followed, as shown at block 230, by demodulating and decoding the desired signal and, in some cases, one or more addressable interferers, using an interference-mitigation technique that takes addressable interferers into account. It should be noted that the initial set of interferers may be empty, in some instances. Furthermore, some interferers, such as a known pilot signal like the Common Pilot Channel (CPICH), do not need demodulating and decoding but may nonetheless be address by an interference-mitigating demodulation of the desired signal. Generally speaking, the interference-mitigation technique applied in the demodulating and decoding of the desired signal may include, for example, linear interference rejection combining, or subtractive interference cancellation of the addressable interferers, or joint demodulation of the desired signal and one or more of the interfering signals, or some combination of these techniques. An example of one suitable receiver configuration is described in U.S. patent application Ser. No. 13/165,090, the entire contents of which are incorporated herein by reference.

If the decoding of the desired signal is successful, the process terminates, as shown at 250, or is repeated for a new signal or a new block of data. If the decoding is unsuccessful, on the other hand, the process is reiterated. More particularly, information obtained from the first attempt at demodulating and decoding the desired signal is fed back into the demodulation process. Thus, the receiver's knowledge of the desired signal characteristics and/or the interfering signal characteristics is updated, as indicated at block 220, and the demodulation and decoding process is repeated. This process may be repeated several times, until the desired signal is successfully decoded, or until the process has been performed a pre-determined number of times, or until the receiver determines that no further improvements in the demodulation/decoding processes are forthcoming.

In many cases this set of addressable interfering signals will not include all of the strongest interfering signals. As explained above, this is because the signal structure and the transport format of the interfering signals must be known before the most effective interference mitigation techniques can be applied. For example, interference-cancellation and joint-demodulation approaches require knowledge of the resource allocation for the interfering signals, such as the spreading and/or scrambling codes used by the interfering signals (e.g., in High-Speed Downlink Packet Access, or HSDPA, systems), or the resource blocks allocated to the interfering signals in Orthogonal Frequency-Division Multiplexing (OFDM) systems (e.g., in the $3^{rd}$-Generation Partnership Projects Long-Term Evolution, or LTE, systems).

These interference-mitigation techniques are also most effective when the details of the modulation technique used for the interfering signals are known, and/or when the details of a Multiple-Input Multiple-Output (MIMO) configuration are known. In various wireless systems, this information (transport block formats, resource allocations, etc.) is conveyed via downlink control channels, such as the High-Speed Shared Control Channel (HS-SCCH) in HSDPA systems and the Physical Downlink Control Channel (PDCCH) in LTE systems. For several reasons, the communications receiver may be unable to access or successfully demodulate and/or decode the control channel information associated with the interfering signals. If the communications receiver does not have this information for one or more interfering signals, those signals will not be included in the set of addressable interferers.

In several embodiments of the present invention, the set of addressable interfering signals is not fixed for the duration of the interference-mitigation process. Thus, the determination of which interferers can or should be addressed is not carried out only in a single pre-processing step, as shown in FIG. 2. Rather, instead of determining the set of addressable interferers once, prior to launching the interference mitigation processing, the control message detection step for additional, not yet detected signals is re-attempted when the receiver has executed some demodulation/decoding iterations, when additional information about the total receiver signal is available. A priori information from previous iterations amounts to improved effective reception conditions for additional interfering signals' control messages. Those messages may then be recovered, allowing the receiver to obtain valuable information about these additional interfering signals, so that the receiver is able to proceed with interference mitigation processing that accounts for more interfering signals, and thus more of the interfering energy.

In several embodiments of the present invention, the task of control message detection from interfering cells is repeated, so that better a priori information obtained from the processed signals from a previous iteration is used to detect additional control messages and to successively grow the set of interfering signals included in the receiver's interference mitigation processing.

The techniques described below may be implemented in the form of an iterative/Turbo receiver structure where detection of other-cell control messages is re-attempted at each of several iterations. The set of addressable interferers may be expanded as the a priori information improves due to the inclusion of more signals in the interference mitigation process.

Figure 3:
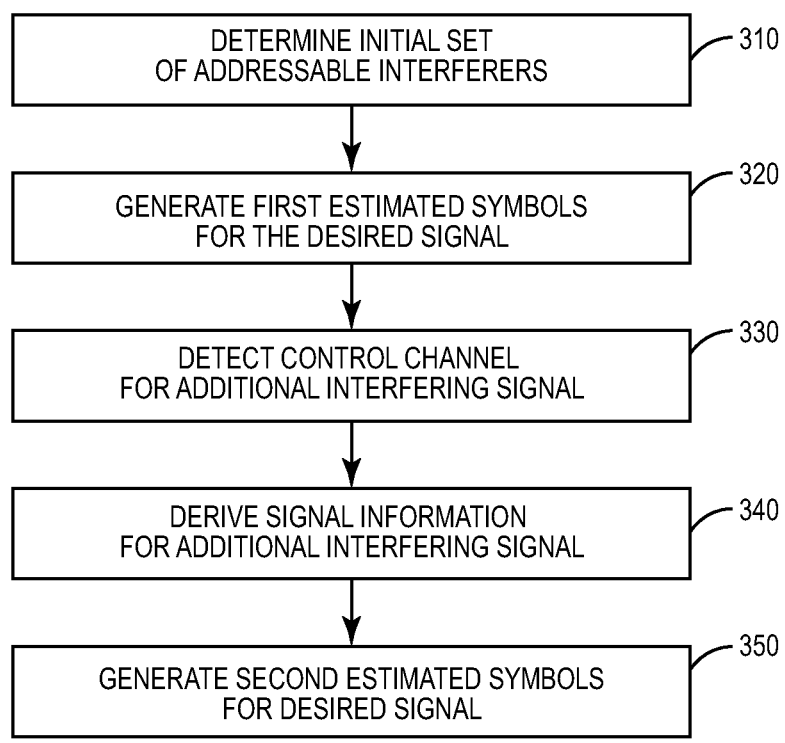
FIG. 3 is another process flow diagram illustrating an improved technique for suppressing interference in a wireless receiver.

FIG. 3 is a process flow diagram illustrating an example process in which two iterations of an interference-suppressing demodulation process are carried out by a communications receiver. This process begins, as shown at block 310, with the determination of an initial set of addressable interferers. This set may be determined, for example, by evaluating neighbor cell signal strength measurements and selecting one or more of the strongest interfering signals, for which control channel information is likely to be easily obtained. In some embodiments, this initial set of addressable interferers may include no interfering signals at all, such as when not enough information regarding an interferer's resource usage or modulation format is available. Further, some systems may choose to apply no interference-mitigation at all in a first pass at demodulating a desired signal, in which case this initial determination of a set of addressable interferers is omitted entirely.

As shown at block 320, the communications receiver generates first estimated symbols for a desired signal. If one or more interfering signals have been previously identified, this step can include the application of one or more interference-mitigation techniques to these one or more previously identified interfering signals. In addition, the control channel for at least one additional interfering signal is detected, as shown at block 330; this detecting is based on the first estimated symbols. Various techniques may be used to detect the control channel, including subtractive interference cancellation, in which an estimate of the desired signal is generated from the first estimated symbols and removed from a received composite signal, to obtain a working signal from which the control channel can be demodulated and decoded. This estimate may be a "soft" estimate in that it reflects only a portion of the original signal—if the signal quality is very poor, the soft estimate may be close to zero. Another technique for detecting the control channel is joint demodulation, in which the estimated symbols for the desired signal and for the control channel are jointly demodulated.

Signal characteristics information for the additional interfering signal is then derived from the detected control channel, as shown at block 340. This derived signal characteristics information is then used to generate second estimated symbols for the desired signal, as shown at block 350, using at least one interference-mitigation technique to mitigate the effects of the interfering signal. Because the set of addressable interfering signals has been expanded, using control channel information that is obtained using information from the first attempt at demodulating the desired signal, better interference suppression is achieved, yielding improved signal-to-interference-noise performance with respect to the desired signal.

As noted above, in some embodiments, the generation of the first estimated symbols may also utilize interference-mitigation processing, using known signal characteristics for at least one previously identified interfering signal, e.g., one of the interferers in the set identified in the step illustrated at block 310. In some embodiments, this interference-mitigation processing includes jointly detecting the estimated symbols for the desired and the at least one previously identified interfering signal, using the known signal characteristics. In some embodiments, subtractive interference cancellation of one or more previously identified interfering signals is performed. Other interference-mitigation techniques, and/or a combination of these techniques may be used in various embodiments.

Figure 4:
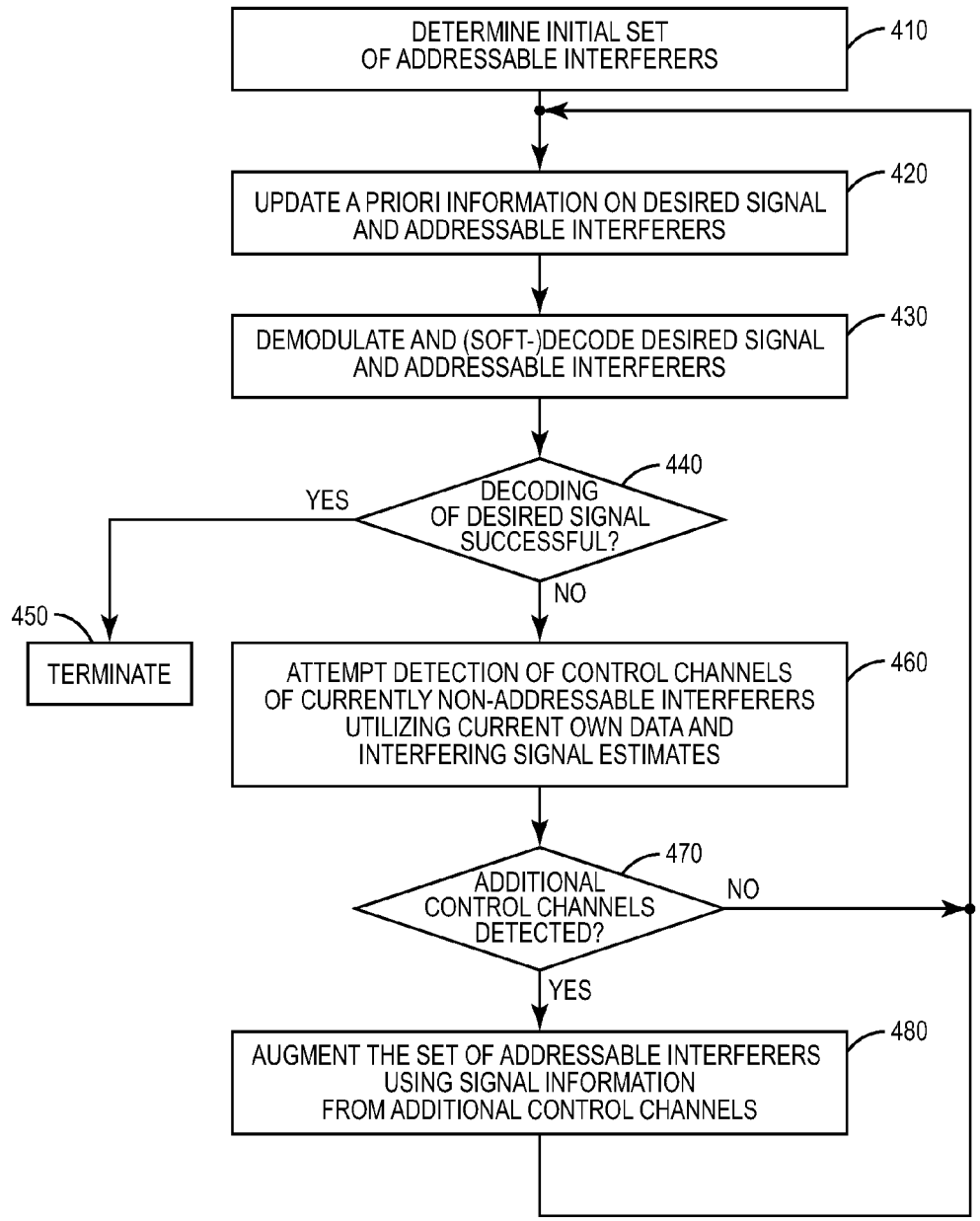
FIG. 4 is another process flow diagram illustrating details of an iterative technique for interference mitigation.

As can be seen in the example process illustrated in FIG. 4, the steps illustrated in FIG. 3 may be applied in an iterative fashion. Just as was illustrated in FIG. 3, an initial set of addressable interferers is determined in a preparatory stage, as shown at block 410. In some embodiments, this step may include an attempt to detect control channels for one or more other users in the own cell, or one or more control channels for users in neighbor cells. The initial set of addressable interferers then consists of the user for which the control channel detection was successful. This initial set may also include a number of known common channels or signals, in some embodiments, such as pilot signals, synchronization signals, common or broadcast control channels, etc.

The iterative portion of the process illustrated in FIG. 4 is shown in blocks 420-440 and blocks 460-480. As seen at block 420, a priori information on the data and interfering signals is updated, for use in the subsequent interference mitigation processing. In the first iteration, this a priori information may consist of, for example, knowledge on static or semi-static interference sources such as pilot signals. In later iterations, the a priori information may additionally consist of soft information obtained in earlier iterations, as will be described below. It should be noted that this information may be partially incomplete in some instances, but may nevertheless be useful. For instance, only portions of a bit or symbol sequence for a control channel or other signal may be known, in some cases. Similarly, in some cases "soft" bits or "soft" symbols," i.e., data that are weighted to reflect the quality of the receiver's estimate of the received data, may be viable types of a priori information that are useful for interference suppression.

Next, as shown at block 430, the target receiver's desired signal and the signals of one or more interferers in the addressable set are demodulated, applying the a priori information, and decoded. In some embodiments, the decoding operation is implemented as soft decoding, providing updated/improved coded bit log-likelihood values even when decoding is unsuccessful. In some cases, only a subset of the addressable interferers are decoded, in which case the subset may be determined based on the anticipated decoding success probability or the expected soft value improvement, which may be estimated by comparing the data signal quality for the interferers and their modulation and coding scheme (MCS) information, Next, the receiver determines whether decoding of the desired signal was successful, as shown at block 440, such as by evaluating a cyclic redundancy check. If so, the process terminates, as shown at block 450. Although not shown in FIG. 4, the receiver may be further configured to terminate the process when a pre-determined number of iterations have been performed, in some embodiments, or when it determines that an improvement in signal-to-interference-plus-noise ratio (SINR), block-error-rate (BLER), or throughput is below a pre-determined threshold.

Otherwise, the receiver attempts (or re-attempts) detection of one or more control channels associated with interfering signals that are not addressed (or incompletely addressed) in previous iterations of the process. This is shown at block 460. This detection utilizes estimates of the data contents of the desired signal and previously addressed interfering signals as side information, in some embodiments. In some embodiments, interference cancellation principles may be used, e.g., by cancelling the impact of the estimated data signals prior to detecting the control channels. In some embodiments, the control channel signal quality after cancellation may be used as a criterion for determining whether or not to attempt control channel decoding. In other embodiments, joint demodulation of the control channel and the desired signal may be used to obtain soft values for control channel decoding. It should be noted that in some embodiments this step may be integrated with the data demodulation/decoding step illustrated at block 440.

If one or more new control channels are detected in the process (see block 470), the corresponding interfering signals are added to the addressable set of interferers, as shown at block 480, and the next iteration is begun.

The iterative process of FIG. 4, in which the set of addressable interferers for interference-mitigation processing is augmented after an initial attempt at demodulating the desired signal, stands in stark contrast to the process illustrated in FIG. 2. There, the addressable set of interferers is determined by first attempting to decode control messages for a set of candidate interfering signals. A multi-stage or iterative receiver is then activated that accounts for the contents of the interfering signals according to the fixed, initially defined configuration.

In several embodiments of the present invention, the techniques described above are implemented in the context of an iterative (Turbo) receiver structure that can handle an arbitrary number of interfering signals, corresponding to transmissions from several other cells and/or users. The desired signal and the individual interfering signals are demodulated jointly and thereafter decoded individually. Soft output information from the decoders is fed back into the joint demodulation stage and used as a priori information to improve the demodulation quality for the next iteration. In accordance with the techniques described above, the a priori information is also used in detecting control messages for cells/users for which the decoding has not yet been successful. Thus, in later iterations, the probability of success of detecting weaker control messages is improved by virtue of the availability of improved a priori information.

Note that the joint demodulation stage may be implemented using a full maximum-likelihood detection (MLD) process, such as a sphere decoding algorithm, or an approximated MLD approach, such as an m-algorithm, or using an interference cancellation process, such as soft subtractive cancellation.

Figure 5:
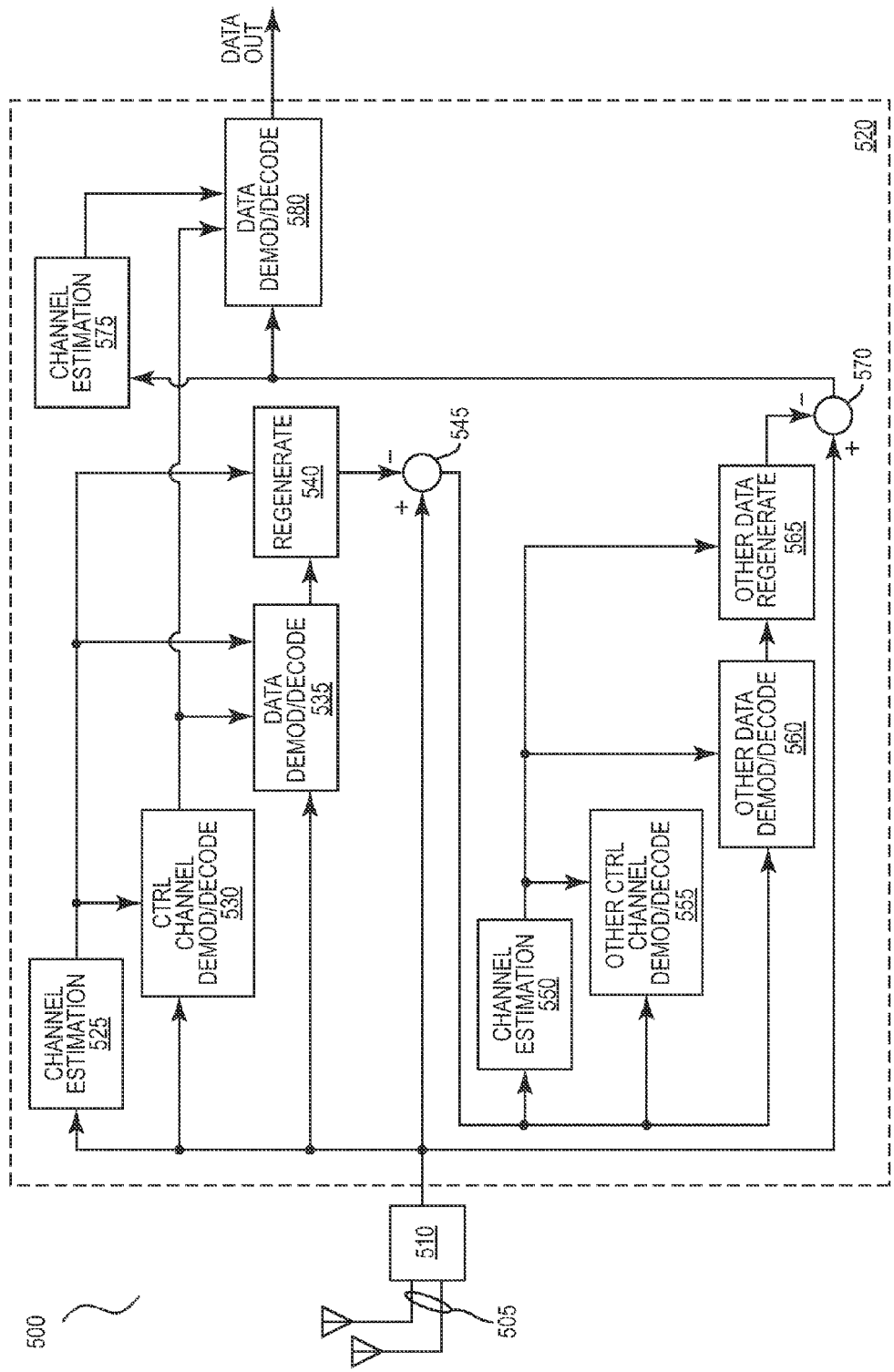
FIG. 5 is a block diagram illustrating an example interference-cancelling receiver according to some embodiments of the present invention

FIG. 5 is a block diagram illustrating the structure of an example communications receiver 500 that utilizes some of the techniques described above. Receiver 500 might be found, for instance, in base station 110 and/or base station 130 of FIG. 1, or in UE 120 or UE 140. The particular configuration illustrated in FIG. 5 addresses a single interferer, thus this receiver configuration might be used, for example, in a scenario with a single interfering cell having a single active user. However, it will be understood that the configuration illustrated in FIG. 5 can be expanded to address additional interfering signals.

Receiver 500 includes a front-end circuit 510 that receives and conditions radio signals from antenna(s) 505, using conventional radio-frequency components and techniques. Front-end circuit 510 also includes an A/D converter that digitizes a portion of the received spectrum for subsequent processing by receiver circuit or signal processing circuit 520.

Several functional aspects of receiver circuit 520 are illustrated in detail in FIG. 5. These aspects are explained here using an HSDPA example, although the receiver structure illustrated in FIG. 5 is applicable to other systems as well.

First, the receiver's own HS-SCCH message is decoded, using control channel demodulator 530, based on channel estimates and receiver combining weights calculated in channel estimator 525. The receiver is then configured to receive and demodulate the receiver's own High-Speed Physical Downlink Shared Channel (HS-PDSCH), and the desired High-Speed Downlink Shared Channel HS-DSCH transport block is decoded, using signal demodulation/decoder 535. In many embodiments, a soft-output turbo decoder is used so that even if decoding is unsuccessful, as indicated by a failed cyclic-redundancy check (CRC), improved soft information for the coded bits is available at the decoder output. The soft output bits are then mapped to soft symbols (expected symbol values), which are then re-spread and filtered, in regenerator 540, using a filter response that emulates the estimated channel radio channel.

Other own-cell signal components, such as pilots, control and broadcast information, may also be extracted and their received contribution re-generated by regenerator unit 540. The total regenerated own-cell signal is then subtracted from the received signal, using subtraction unit 545.

After these steps, the modified received signal exhibits an improved geometry factor with respect to other interferers that have not yet been addressed. This modified signal is then used for other-cell control message detection, using other-channel estimator 550 and other-control-channel-demodulator 555, with increased probability of success. If a control message for the other cell is successfully detected, the interference-cancelling receiver structure may be configured appropriately and the other-cell data signal may be demodulated and decoded, with interfering-signal demodulator/decoder 560, and regenerated, and subtracted from the original received signal, using regenerator other-data regenerator 565 and subtraction unit 570. Finally the reduced-interference received signal is used for demodulation and decoding of the desired data, with channel estimator 575 and desired-signal demodulator/decoder 580.

In HSDPA systems, the interference-cancelling subtraction may advantageously be carried out at the chip-level. However, in these or other systems the signal subtraction may alternatively be performed at different points in the signal flow, such as at the symbol-level in HSDPA, in the time domain or frequency domain in LTE, etc.

Figure 6:
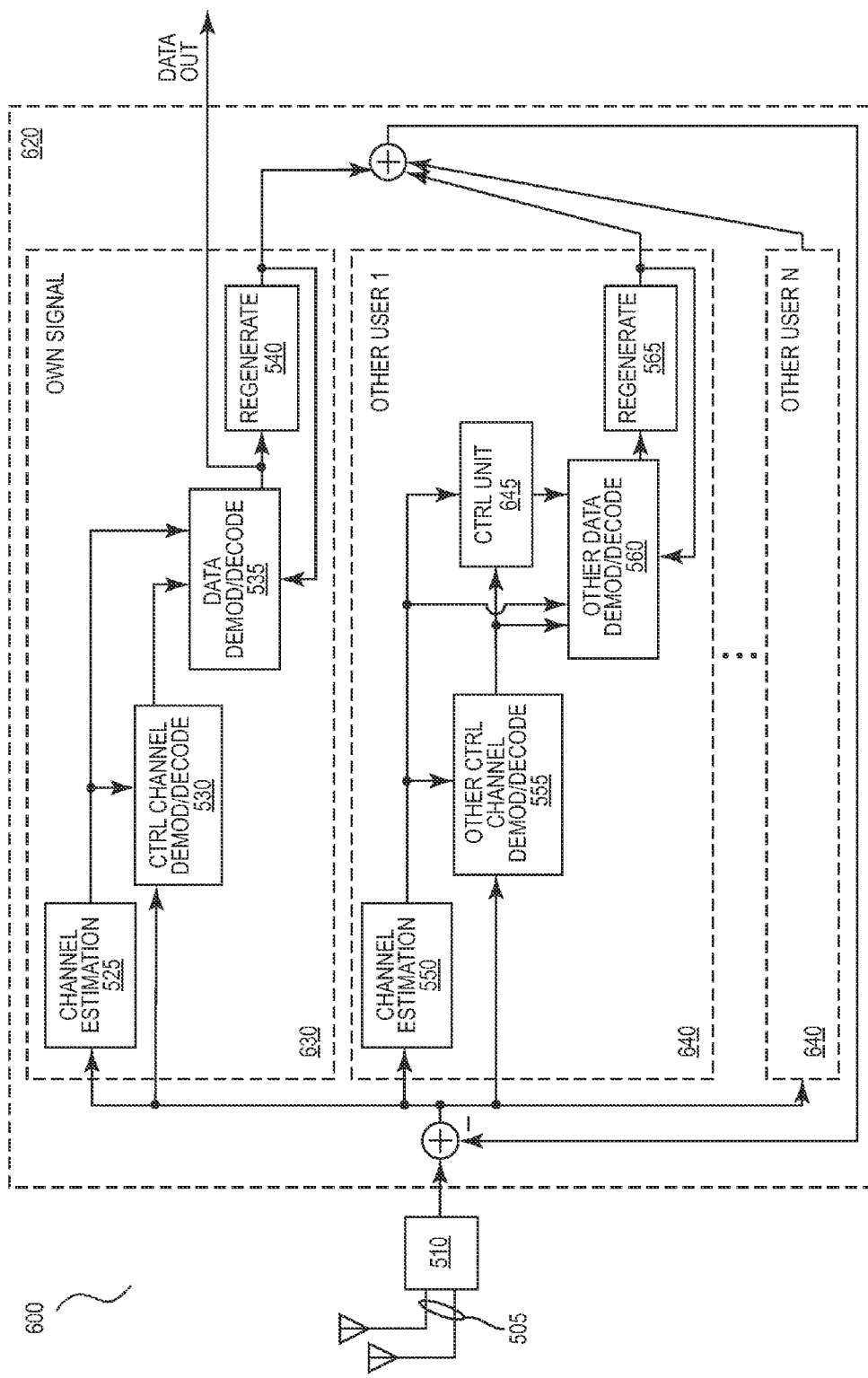
FIG. 6 is a block diagram illustrating another example interference-cancelling receiver.

FIG. 6 illustrates the structure of another example communications receiver 600. Receiver 600 features a parallel interference-cancellation (PIC) architecture, where control channel decoding for all interfering users is re-attempted at each iteration, until all viable users' control messages have been retrieved. Accordingly, receiver circuit 620 includes several parallel branches—an own-signal branch 630 and one or more other-user branches 640. The initial branch setup may be determined based on neighbor cell signal strength measurements, for example. Thus, the cells and/or users with the largest interfering energy contributions are treated in the first iteration. Additional other-cell users' control messages may be detected at later iterations, once sufficient interfering energy has been regenerated and removed by the interference cancellation. Such additional cells/users may then be added as additional PIC branches at later iterations.

Note that in receiver circuit 620 the operation of the other-user branch 640 is controlled by control unit 645. In some embodiments of the invention, the control unit evaluates the possible demodulation/decoding modes for the other signal, based on the information extracted from the control channel. For instance, it may be the case that only the part 1 message was received from the High-Speed Shared Control Channel (HS-SCCH) in the HSPA downlink, which yields modulation information. Because the part 2 message, with the specific transport format information, was not received, perhaps only pre-decoding interference cancellation is possible. Control unit 645 thus selects one of the possible demodulation and/or decoding modes for the interfering signal, preferably the most advantageous from a performance point-of-view, based on the signal characteristics information obtained from the control channel. While FIG. 5 does not show a control unit, it will be appreciated that it may include a similar unit, in some embodiments.

FIGS. 5 and 6 illustrate examples of receiver embodiments that utilize post-decoding interference cancellation. It will be appreciated that other interference-mitigation techniques may be used in one or several branches of a receiver that uses a parallel architecture, or in one or several stages of an iterative receiver process. In some embodiments of the invention, the receiver configurations used for handling the individual interfering cells (linear suppression, pre- or post-decoding IC, etc.) may be determined dynamically, in some cases on a per-branch or per-stage basis, based on the available modulation and coding scheme information for a given interferer and/or its associated control channel and/or their signal qualities. As additional control message information becomes available in later iterations, the receiver configuration may be modified to reflect that information.

Accordingly, in some embodiments, a different interference-mitigation technique may be used in subsequent iterations of the processing. The different interference-mitigation technique may differ with respect to the number of interferers that are addressed, or it may differ with respect to the interference-mitigation principle that is used, such as soft interference subtraction versus joint detection. In particular, the technique used with the expanded set of interferers may vary, depending on what is learned from the detected control channel. For example, generating the first estimated symbols for the desired signal is based on a first interference mitigation technique, in some embodiments, while a second interference-mitigation technique is selected for generating the second estimated symbols in the next iteration, based on the signal characteristics information derived from the detected control channel. In various embodiments, these first and second interference-mitigation techniques are from the group consisting of: no interference mitigation; linear interference suppression; joint detection; pre-decoding subtractive interference cancellation; and post-decoding subtractive interference cancellation. Of course, other suitable interference processing may be used instead of or in addition to any of these techniques.

While several embodiments of the invention have been described above in the context of other-cell interference mitigation, the same techniques may also be used to facilitate decoding control messages and mitigating interference from data transmissions meant for other users in the same cell. The idea also applies to neighbor cells in an intra-site configuration, as well as multi-user MIMO (MU-MIMO) data transmission.

Since a wide range of interference mitigation receiver structures exists, many configurations other than those illustrated herein are possible, where a priori information prior to control message detection may be utilized according to the techniques described above. These techniques are applicable to most wireless cellular systems, including HSPA and LTE systems. Furthermore, the same or similar techniques may be used in the uplink of a cellular network, or in other network topologies.

As an example of an uplink HSPA (HSUPA) scenario, the received signal from a UE may be subject to strong interference from a UE connected to a neighboring cell. If this interfering UE is close to its serving base station, the control channel E-DCH Dedicated Physical Control Channel (E-DPCCH) may be transmitted with a low power and may not be decodable by the base station of interest. In the case of co-located cells, the control info for the other-cell users may be available with limited effort. More generally, the information would need to be obtained from the neighboring base station via the Radio Network Controller (RNC) interface, which has excessive latency for interference cancellation purposes. Therefore, the techniques described above may be applied to extend the set of addressable uplink interferers in a base station as well, by detecting additional E-DPCCH messages.

The inventive techniques disclosed herein improve control message availability for the other-cell signals, thus expanding the addressable set of interfering signals. These techniques thus widen the range of scenarios where efficient interference mitigation is possible.

For instance, consider a simple scenario with a single interfering neighbor cell. When the UE of interest is at the cell edge, e.g., with a low own-cell geometry of 0 to 3 dB, unaided control message decoding would have a low success rate. However, the techniques described above allow the probability of successful control message decoding to be significantly improved. In scenarios where the UE is away from the cell edge, e.g., with own-cell geometry exceeding 3 dB, unaided control message decoding for control channels associated with interfering signals from neighboring cells would be impossible, in principle. The techniques of the present invention allow neighbor-cell interference mitigation to be extended to medium geometry cases, i.e., situations where the signal strength of the serving cell is significantly stronger than that of the neighboring cells, but still low enough so that suppression of interference from the neighboring cells is beneficial. Thus, a larger percentage of the UEs in the cell can benefit from it, leading to corresponding link- and system-level performance improvements.

In parallel interference cancellation receivers, the techniques described herein permit successively separating and regenerating a larger number of neighbor cells and/or users than would be possible with unaided control message detection, thus enabling cancellation of larger percentage of interfering energy.

The techniques described above include methods for performing interference mitigation with one or more other users or other interfering signals in the downlink, in a multi-stage/iterative receiver where a control message for at least one candidate other user initially not detected is re-detected after one or more receiver stages/iterations have been executed, utilizing a priori information available from those previous stages/iterations. In some of these methods, an iterative architecture is used where the desired and candidate other users are processed via joint detection and decoded separately at each iteration to produce soft a priori information for the next iteration. This joint detection may be achieved by using a parallel interference cancellation architecture, where each of several branches corresponds to a user—one "own", the rest "other" (interfering). At each iteration, detection of each not-yet-detected other user's control message is re-attempted. New branches are added at later iterations if additional control messages for interfering users are discovered from the successively cleaner signal. In several of these methods, an architecture is used where at least an own-cell signal estimate is subtracted from the received signal prior to other user's control message demodulation/decoding.

As will be readily understood by those familiar with communications receiver design, receiver circuits 520 and 620 and each of the various functional blocks of those receiver circuits may be implemented using digital logic and/or one or more microcontrollers, microprocessors, or other digital hardware. All of the various functions of receiver circuit 520 or 620 may be implemented together, such as in a single application-specific integrated circuit (ASIC), or in two or more separate devices with appropriate hardware and/or software interfaces between them. One or more of the elements of FIGS. 5 and 6 may be implemented on a processor shared with other functional components of a UE, for example. Alternatively, several of the functional elements of the receiver processing circuits discussed above may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

With these and other variations and extensions in mind, it should be appreciated that the foregoing description and the accompanying drawings represent non-limiting examples of the methods and apparatus taught herein for reducing interference to a desired signal from a plurality of interfering signals, whether or not the received signal is an HSPA signal. As such, the inventive apparatus and techniques taught herein are not limited by the foregoing description and accompanying drawings. Instead, the present invention is limited only by the following claims and their legal equivalents.

What is claimed is:

1. A method in a communications receiver of reducing interference to a desired signal, the method comprising:
   generating first estimated symbols for the desired signal;
   detecting a control channel corresponding to a first interfering signal, wherein said detecting is based on the first estimated symbols;
   deriving signal characteristics information for the first interfering signal from the detected control channel; and
   generating second estimated symbols for the desired signal, using the derived signal characteristics for the first interfering signal.

2. The method of claim 1, wherein generating the first estimated symbols comprises interference-mitigation processing using known signal characteristics for at least one previously identified interfering signal.

3. The method of claim 2, wherein said interference-mitigation processing comprises jointly detecting the first estimated symbols and the at least one previously identified interfering signal, using the known signal characteristics.

4. The method of claim 2, wherein said interference-mitigation processing comprises subtractive interference cancellation of the at least one previously identified interfering signal, using the known signal characteristics.

5. The method of claim 2, further comprising identifying the at least one previously identified interfering signal by evaluating neighbor cell signal strength measurements and selecting the at least one previously identified interfering signal based on said evaluating.

6. The method of claim 2, wherein generating the first estimated symbols for the desired signal is based on a first interference-mitigation technique, the method further comprising selecting a second interference-mitigation technique for generating the second estimated symbols, based on the signal characteristics information derived from the detected control channel.

7. The method of claim 6, wherein the first and second interference-mitigation techniques are from the group consisting of:
   no interference mitigation;
   linear interference suppression;
   joint demodulation;
   pre-decoding subtractive interference cancellation; and
   post-decoding subtractive interference cancellation.

8. The method of claim 1, wherein detecting the control channel comprises:
   generating a soft estimate of the desired signal, using the first estimated symbols;
   subtracting the soft estimate of the desired signal from a received composite signal, to obtain a working signal; and
   demodulating the control channel from the working signal.

9. The method of claim 1, wherein detecting the control channel comprises:
   generating an estimate of the desired signal, using the first estimated symbols;
   generating an estimate of at least one previously identified interfering signal;
   subtracting the estimate of the desired signal and the estimate of the at least one interfering signal from a received composite signal, to obtain a working signal; and
   demodulating the control channel from the working signal.

10. The method of claim 1, wherein detecting the control channel comprises jointly detecting the first estimated symbols and estimated symbols for the control channel.

11. The method of claim 10, wherein detecting the control channel comprises jointly detecting the first estimated symbols, estimated symbols for at least one previously identified interfering signal, and estimated symbols for the control channel.

12. The method of claim 1, wherein generating the first estimated symbols for the desired signal comprises obtaining soft symbols for the desired signal, and wherein said detecting the control channel is based on the soft symbols for the desired signal.

13. The method of claim 12, wherein obtaining soft symbols comprises mapping soft bit values from a channel decoder output to soft symbol values.

14. The method of claim 13, wherein the channel decoder output comprises an output from one of a Viterbi decoder and a Turbo decoder.

15. The method of claim 2, wherein the known signal characteristics comprise characteristics of one or more of an interfering pilot signal, an interfering common control channel signal, and an interfering synchronization signal.

16. The method of claim 2, wherein the known signal characteristics or the derived signal characteristics, or both, comprise one or more of the following:
    a scrambling code for an interfering signal, or a spreading code for an interfering signal, or both;
    resource blocks allocated to an interfering signal;
    a modulation scheme used by an interfering signal;
    a multiple-antenna transmission configuration for an interfering signal;
    a multiple-antenna precoding vector used for an interfering signal; and
    a transport format resource combination for an interfering signal.

17. A communication receiver comprising a front-end circuit configured to receive a composite signal including a desired signal and one or more interfering signals, and a signal processing circuit configured to:
    generate first estimated symbols for the desired signal;
    detect a control channel corresponding to a first interfering signal, wherein said detecting is based on the first estimated symbols;
    derive signal characteristics information for the first interfering signal from the detected control channel; and
    generate second estimated symbols for the desired signal, using the derived signal characteristics for the first interfering signal.

18. The communication receiver of claim 17, wherein the signal processing circuit is configured to generate the first estimated symbols using interference-mitigation processing based on known signal characteristics for at least one previously identified interfering signal.

19. The communication receiver of claim 18, wherein said interference-mitigation processing comprises joint detection of the first estimated symbols and the at least one previously identified interfering signal, using the known signal characteristics.

20. The communication receiver of claim 18, wherein said interference-mitigation processing comprises subtractive interference cancellation of the at least one previously identified interfering signal, using the known signal characteristics.

21. The communication receiver of claim 18, wherein the signal processing circuit is further configured to identify the at least one previously identified interfering signal by evaluating neighbor cell signal strength measurements and selecting the at least one previously identified interfering signal based on said evaluating.

22. The communication receiver of claim 18, wherein the signal processing circuit is configured to generate the first estimated symbols for the desired signal based on a first interference-mitigation technique, and wherein the signal processing circuit is further configured to select a second interference-mitigation technique for generating the second estimated symbols, based on the signal characteristics information derived from the detected control channel.

23. The communication receiver of claim 22, wherein the first and second interference-mitigation techniques are from the group consisting of:
    no interference mitigation;
    linear interference suppression;
    joint demodulation;
    pre-decoding subtractive interference cancellation; and
    post-decoding subtractive interference cancellation.

24. The communication receiver of claim 17, wherein the signal processing circuit is configured to detect the control channel by:
    generating a soft estimate of the desired signal, using the first estimated symbols;
    subtracting the soft estimate of the desired signal from a received composite signal, to obtain a working signal; and
    demodulating the control channel from the working signal.

25. The communication receiver of claim 17, wherein the signal processing circuit is configured to detect the control channel by:
    generating an estimate of the desired signal, using the first estimated symbols;
    generating an estimate of at least one previously identified interfering signal;
    subtracting the estimate of the desired signal and the estimate of the at least one interfering signal from a received composite signal, to obtain a working signal; and
    demodulating the control channel from the working signal.

26. The communication receiver of claim 17, wherein the signal processing circuit is configured to detect the control channel by jointly detecting the first estimated symbols and estimated symbols for the control channel.

27. The communication receiver of claim 26, wherein the signal processing circuit is configured to detect the control channel by jointly detecting the first estimated symbols, estimated symbols for at least one previously identified interfering signal, and estimated symbols for the control channel.

28. The communication receiver of claim 17, wherein the signal processing circuit is configured to generate the first estimated symbols for the desired signal by obtaining soft symbols for the desired signal, and is further configured to detect the control channel based on the soft symbols for the desired signal.

29. The communication receiver of claim 28, wherein the signal processing circuit is configured to obtain soft symbols by mapping soft bit values from a channel decoder output to soft symbol values.

30. The communication receiver of claim 29, wherein the channel decoder output comprises an output from one of a Viterbi decoder and a Turbo decoder.

31. The communication receiver of claim 18, wherein the known signal characteristics comprise characteristics of one or more of an interfering pilot signal, an interfering common control channel signal, and an interfering synchronization signal.

32. The communication receiver of claim 18, wherein the known signal characteristics or the derived signal characteristics, or both, comprise one or more of the following:
    a scrambling code for an interfering signal, or a spreading code for an interfering signal, or both;
    resource blocks allocated to an interfering signal;

a modulation scheme used by an interfering signal;

a multiple-antenna transmission configuration for an interfering signal;

a multiple-antenna precoding vector used for an interfering signal; and a transport format resource combination for an interfering signal.

33. A base station comprising the communication receiver of claim 17.

34. A mobile terminal comprising the communication receiver of claim 17.

35. A signal processing circuit for reducing interference to a desired signal, the signal processing circuit comprising:

a signal detection circuit configured to generate first estimated symbols for the desired signal and to detect a control channel corresponding to a first interfering signal, wherein the detecting is based on the first estimated symbols; and an interference evaluation circuit configured to derive signal characteristics information for the first interfering signal from the detected control channel;

wherein said signal detection circuit is further configured to generate second estimated symbols for the desired signal, using the derived signal characteristics for the first interfering signal.

36. The signal processing circuit of claim 35, wherein the signal detection circuit is configured to generate the first estimated symbols using interference-mitigation processing, based on signal characteristics for at least one previously identified interfering signal.

37. The signal processing circuit of claim 36, wherein the interference evaluation circuit is further configured to evaluate neighbor cell signal strength measurements and to select the at least one previously identified interfering signal based on said evaluating.

38. The signal processing circuit of claim 35, wherein said signal detection circuit comprises a successive interference cancellation circuit configured to:

estimate the desired signal, using the first estimated symbols;

subtract the estimate of the desired signal from a received composite signal, to obtain a working signal; and demodulate the control channel from the working signal.

* * * * *